US011060690B2

(12) United States Patent  
Albou et al.

(10) Patent No.: US 11,060,690 B2  
(45) Date of Patent: Jul. 13, 2021

(54) LUMINOUS MOTOR-VEHICLE DEVICE COMPRISING A LIGHT SOURCE COMPRISING A PLURALITY OF EMITTING ELEMENTS

(71) Applicant: VALEO VISION, Bobigny (FR)

(72) Inventors: Pierre Albou, Bobigny (FR); Vincent Godbillon, Bobigny (FR)

(73) Assignee: VALEO VISION, Bobigny (FR)

( * ) Notice: Subject to any disclaimer, the term of this patent is extended or adjusted under 35 U.S.C. 154(b) by 28 days.

(21) Appl. No.: 16/489,531

(22) PCT Filed: Feb. 26, 2018

(86) PCT No.: PCT/EP2018/025046  
§ 371 (c)(1),  
(2) Date: Aug. 28, 2019

(87) PCT Pub. No.: WO2018/157973  
PCT Pub. Date: Sep. 7, 2018

(65) Prior Publication Data  
US 2020/0011503 A1    Jan. 9, 2020

(30) Foreign Application Priority Data

Feb. 28, 2017   (FR) ...................................... 1751638

(51) Int. Cl.  
*F21S 43/20* (2018.01)  
*B60Q 1/26* (2006.01)  
(Continued)

(52) U.S. Cl.  
CPC ............ *F21S 43/26* (2018.01); *B60Q 1/2607* (2013.01); *F21S 43/13* (2018.01); *B60Q 1/44* (2013.01);  
(Continued)

(58) Field of Classification Search  
CPC ...... F21S 43/26; F21S 43/13; B60Q 1/12607; B60Q 3/60; B60Q 2400/30  
See application file for complete search history.

(56) References Cited

U.S. PATENT DOCUMENTS

2008/0013329 A1   1/2008   Takeda et al.  
2015/0243853 A1   8/2015   Cha et al.  
(Continued)

FOREIGN PATENT DOCUMENTS

DE          203 15 175 U1    1/2004  
DE    10 2010 056 313 A1    6/2012  
(Continued)

OTHER PUBLICATIONS

International Search Report dated Jun. 13, 2018 in PCT/EP2018/025046 filed Feb. 26, 2018.

*Primary Examiner* — Joseph L Williams  
(74) *Attorney, Agent, or Firm* — Oblon, McClelland, Maier & Neustadt, L.L.P.

(57) ABSTRACT

A luminous device for a motor vehicle, comprising a light source including a plurality of emitting elements that are configured to form at least one first emission zone and one second emission zone that are addressable selectively from each other. The luminous device also comprises a screen that is at least partially transparent to the light emitted by the light source, comprising first transmission zones and second transmission zones that are respectively arranged facing the first and second emission zones, the first transmission zones being configured to scatter the light beams emitted by the first emission zones.

19 Claims, 2 Drawing Sheets

(51) Int. Cl.
*F21S 43/13* (2018.01)
*F21Y 115/20* (2016.01)
*B60Q 3/60* (2017.01)
*F21W 103/10* (2018.01)
*F21W 103/35* (2018.01)
*F21W 106/00* (2018.01)
*F21W 103/55* (2018.01)
*B60Q 1/44* (2006.01)

(52) U.S. Cl.
CPC ............ *B60Q 3/60* (2017.02); *B60Q 2400/30* (2013.01); *F21W 2103/10* (2018.01); *F21W 2103/35* (2018.01); *F21W 2103/55* (2018.01); *F21W 2106/00* (2018.01); *F21Y 2115/20* (2016.08)

(56) References Cited

U.S. PATENT DOCUMENTS

| | | |
|---|---|---|
| 2015/0367776 A1 | 12/2015 | Salter et al. |
| 2017/0352601 A1 | 12/2017 | Hugon |

FOREIGN PATENT DOCUMENTS

| | | |
|---|---|---|
| EP | 2 161 494 A1 | 3/2010 |
| EP | 2 846 081 A1 | 3/2015 |
| EP | 2 927 051 A1 | 10/2015 |
| FR | 3 030 995 A1 | 6/2016 |
| GB | 2473311 A | 3/2011 |

LUMINOUS MOTOR-VEHICLE DEVICE COMPRISING A LIGHT SOURCE COMPRISING A PLURALITY OF EMITTING ELEMENTS

BACKGROUND OF THE INVENTION

Field of the Invention

The present invention relates to the technical field of lighting and/or signalling and it furthermore relates, in one preferred application, but not exclusively, to the field of front or rear luminous motor-vehicle devices.

Description of the Related Art

The field of lighting is regulated and hence lighting modules designed by motor-vehicle manufacturers must provide illumination that meets very precise standards established for the safety of road users. Regulations in particular set the colour and intensity of the resulting light beams. In particular, motor vehicles are required to be equipped with position lights, and in particular rear position lights, in order to signal their position and their movement to other road users.

Each vehicle is also equipped with rear lights for indicating braking, which turn on automatically when a braking action is taken, or detected, so as to signal to other road users the deceleration of the vehicle in front of them and the risk that this may generate. Once again, these braking indicators are regulated with respect to the colour, red, that they must emit.

At the present time, companies active in the motor-vehicle market aim, for reasons of vehicle design and bulk, to emit, via a given lighting surface, various light beams each corresponding to one specific lighting or signalling function.

In addition, with the expected future adoption of autonomous motor vehicles, the interior lighting of motor vehicles is of increasing importance. The functions thereof in particular range from reading lights, to selective lighting of one or more zones of the passenger compartment and may even include ambient lighting or indeed the display of logos.

BRIEF SUMMARY OF THE INVENTION

In this context, the invention aims to provide a luminous device that allows a plurality of lighting functions, and in particular braking-indicator and position-light functions, or interior lighting functions, to be combined so that their respective beams are emitted through a common lighting exit surface. Optionally, the invention also allows the white hues emitted by each of the lighting and/or signalling functions to be varied.

The invention proposes a luminous motor-vehicle device comprising a light source including a plurality of emitting elements. By "emitting elements", what is meant is elements able to emit light beams. The emitting elements are configured to form at least one first emission zone and one second emission zone that are addressable selectively from each other. The invention also comprises a screen that is at least partially transparent, to the light emitted by the light source, and that comprises first transmission zones and second transmission zones that are respectively arranged facing the first and second emission zones. The first transmission zones are configured to scatter the light beams emitted by the first emission zones.

By "to scatter", what is meant is the ability of the first transmission zones to increase the opening angle of the light beams emitted by the first emission zones. The first transmission zones thus make it possible to disperse more widely in the environment the light beams that pass therethrough, with respect to the second transmission zones.

According to one feature of the invention, the emission zones differ in the density and/or the height of the emitting elements from which it is composed. In particular, the one or more first emission zones, which correspond to the scattering first transmission zones, have a density of emitting elements lower than the density of the emitting elements in the one or more second emission zones.

The emitting elements may extend from the same growth substrate. It will be understood that, in the case of emitting elements that protrude from a substrate, the light intensity of one emission zone with respect to the other may vary depending on the density of the emitting elements from which it is composed or indeed depending on the height of these emitting elements, given that the higher the density of the emitting elements or the higher the height of these emitting elements, the higher the intensity of the light emitted by the corresponding emission zone. In the following description, a density of emitting elements that varies from one emission zone to the next will more particularly be described, though this is not intended to limit an application in which it is the height of these emitting elements that varies.

The invention proposes a luminous device comprising emission zones the light intensities of which differ, between the first and second zones, because of the difference in the density of emitting elements in said zones. Thus, the luminous device according to the invention is configured to emit at least two spatially disassociated light signals of different intensities. Thus, the invention advantageously allows a single luminous device to be used to emit two light signals that are easily distinguishable by an observer. By "observer", what is meant is a person looking at the screen face-on.

Advantageously, the first transmission zones are arranged on the screen so as to be mainly, and preferably solely, facing the first emission zones. The first transmission zones allow the light beams emitted by the first emission zones to be spread over a large solid angle, so as to amplify the difference, in the light intensity perceived by an observer, between the light beams that pass through the first and second transmission zones. The invention allows, in this way, an observer to distinguish at least two light beams emitted by the luminous device, a first light beam of low intensity emitted by a first emission zone and that passes through a first transmission zone, and a second light beam of high intensity emitted by a second emission zone and that passes through a second transmission zone. The difference in intensity between the first and second light beam may be higher than 10, and higher than 100, in particular in the case of an application to a lamp forming both a position light and a daytime running light.

According to another advantage, the first emission zones allow the uniformity of the light transmitted by the screen to be increased, so as to give the impression, to an observer, of a light source that is uniform or substantially uniform when only the first emission zones are activated. By "to activate", what is meant is the fact of allowing at least one emission zone to emit a light beam. Thus, the luminous device allows, through a given screen, low-intensity uniform light and/or a plurality of distinct high-intensity lights to be emitted. Thus, the invention allows a single screen to be used to emit these two types of light signals, this allowing the dimensions of the light source and therefore the dimensions of the lamps comprising said source to be decreased. Hence, the invention provides a luminous device that is more compact with respect to the prior art. According to another advantage, the luminous device requires a lower number of light sources, this allowing its production cost to be decreased. According to yet another advantage, the luminous device makes it possible to make the beam created by the first zones visible from larger angles with respect to the vehicle axis than those at which the beam created by the second zones may be observed.

According to various features of the invention, which may be implemented alone or in combination, provision may be made for the following:

- the first transmission zones of the screen may comprise scattering elements, in order to increase the impression of uniform light described above; the terms "scattering elements" are understood to mean any means allowing the light rays of the beam to be deviated in relatively random directions;
- the scattering elements are present in the screen and/or on the surface of the screen; by way of example, the scattering elements may take the form of a grain in the surface of the screen;
- the first transmission zones may be translucent, i.e. transmit the light beams without it being possible to clearly distinguish the outlines of the first emission zones; of course, one or other of these alternatives will be chosen depending on the dimensions of the emission zones, on the dimensions of the transmission zones and on their respective spacing, so as to give the impression, to an observer, that the luminous device emits uniform light from the surface of the screen, when only the first emission zones are activated;
- the second transmission zones of the screen may be transparent to the light beams emitted by the second emission zones of the light source; by "transparent", what is meant is the ability of the second transmission zones to let light beams pass so that an observer is able to clearly distinguish the outlines of the second emission zones; optionally, one or more shields may be interposed between the first and second emission zones, so as to ensure that only the beams emitted by the first emission zones pass through the first transmission zones;
- the second transmission zones of the screen may be configured to decrease the divergence of the light beam emitted by the second emission zones; for example, the second transmission zones of the screen may comprise micro-lenses; it is thus possible to accentuate the light intensity perceived by an observer looking at the second transmission zones and thus to further increase the difference in light intensity between the first and second emission zones in a given angular field, in practice one close to the axis of the vehicle;
- the first emission zones may be encircled by the second emission zones; this advantageously makes it possible to create the effect of a light source of higher uniformity in the first transmission zones when only the first emission zones are activated; preferably, all of the first emission zones are aligned or arranged in concentric rings;
- the first emission zones of the light source may be activatable independently of the second emission zones, in order to preserve the light-source uniformity effect described above; according to another advantage, it is thus possible to assign a different function to the first and to the second emission zones;
- the one or more first emission zones of the light source may emit a light beam of a first colour and the one or more second emission zones may emit a light beam of a second colour;
- the first colour may be identical to the second colour; the first colour and the second colour may be red, in particular in a context in which the activation of the first emission zones is associated with the position of the vehicle and the activation of the second emission zones is associated with the braking thereof;
- each emission zone may comprise a plurality of electroluminescent units of sub-millimetre dimensions in order to emit a light beam; thus, a technology consisting in forming the light-emitting part from a plurality of electroluminescent units that are grown on a substrate in order to produce a three-dimensional topology, is applied to the automotive field. These units may take the form of pads or rods. The three-dimensional topology of rods has the advantage of multiplying the light-emitting area with respect to the light-emitting diodes conventionally used in the automotive field, namely substantially planar diodes; thus, it is possible to deliver, at lower cost price, a very bright light. The pad topology has the advantage of allowing a clearly higher density with respect to the light-emitting diodes conventionally used in the automotive field.

The fact that the electroluminescent units are selectively activatable, that at least two groups of electroluminescent units of the light source are arranged to be turned on selectively, and that a module for controlling the separate activation of these units is provided, allowing the units to be turned on or turned off separately from one another, whether simultaneously or not, allows a light comprising precisely defined first and second emission zones to be produced.

Preferably, the electroluminescent units protrude from the same substrate, and they may in particular be formed directly on this substrate. Provision may be made for the substrate to be based on silicon or silicon carbide. It will be understood that the substrate is based on silicon if it mainly contains silicon, for example at least 50% and in practice about 99% silicon.

According to a series of features specific to the structure of the electroluminescent rods and to the arrangement of these electroluminescent rods on the substrate, provision will possibly be made for the following, each of these features being implementable alone or in combination with the others:

- each rod has a cylindrical general shape, in particular of polygonal cross section; provision will possibly be made for each rod to have the same general shape, and in particular a hexagonal shape;
- the rods are each bounded by an end face and by a circumferential wall that extends along a longitudinal axis of the rod defining its height, the light being emitted at least from the circumferential wall; this light could also be emitted via the end face;
- each rod may have an interface that is substantially perpendicular to the circumferential wall, and in various variants, provision may be made for this end face to be substantially planar or curved, or to have a tip at its centre;
- the rods are arranged in a two-dimensional matrix array, this matrix array either being regular, with a constant spacing between two successive rods of a given alignment, or the rods being arranged staggered;

the height of a rod is comprised between 1 and 10 microns;

the largest dimension of the end face is smaller than 2 microns;

the distance that separates two immediately adjacent rods is at least equal to 2 microns, and at most equal to 100 microns.

According to other features, provision will possibly be made for the semiconductor light source comprising a plurality of electroluminescent rods of sub-millimetre dimensions to furthermore include a layer of a polymer material forming an encapsulation in which the rods are at least partially embedded; such an encapsulation is deposited on the substrate so as to cover the rods, and it is advantageous for the encapsulation to extend at least to cover the tallest rod. This polymer material may be based on silicone, it being understood that the polymer material is based on silicone if it mainly contains silicone, for example at least 50% and in practice about 99% silicone. The layer of polymer material may comprise a luminophore or a plurality of luminophores that are excited by the light generated by at least one of the plurality of rods. By luminophore, or light converter, what is meant is the presence of at least one luminescent material designed to absorb at least some of at least one excitation light emitted by a light source and to convert at least some of said absorbed excitation light into a light emission having one or more wavelengths different from that of the excitation light. This luminophore, or this plurality of luminophores, may be at least partially embedded in the polymer or indeed placed on the surface of the layer of polymer material.

According to a series of features specific to the structure of the electroluminescent pads and to the arrangement of these electroluminescent pads on the substrate, provision will possibly be made for the following, each of these features being implementable alone or in combination with the others:

each pad to have a parallelepipedal general shape, in particular of square cross section; provision will possibly be made for each pad to have the same general shape, and in particular a regular rectangular shape;

the pads are each bounded by an end face and by a side wall that extends along a longitudinal axis of the pad defining its height, the light being emitted at least from the end face; this light could also be emitted via the side wall;

each pad may have an endface that is substantially perpendicular to the side wall, and in various variants, provision may be made for this end face to be substantially planar;

the pads are arranged in a two-dimensional matrix array, this matrix array being regular, with a constant spacing between two successive pads of a given alignment;

the length and the width of the cross section of the pad are each smaller than 70 µm.

According to other features, provision will possibly be made for the semiconductor light source comprising a plurality of electroluminescent pads of sub-millimetre dimensions to furthermore include a layer of a polymer material forming an encapsulation in which the pads are at least partially embedded; such an encapsulation is deposited on the substrate so as to cover the pads, and it is advantageous for the encapsulation to extend at least to cover the tallest pad. This polymer material may be based on silicone, it being understood that the polymer material is based on silicone if it mainly contains silicone, for example at least 50% and in practice about 99% silicone. The layer of polymer material may comprise a luminophore or a plurality of luminophores that are excited by the light generated by at least one of the plurality of pads. By luminophore, or light converter, what is meant is the presence of at least one luminescent material designed to absorb at least some of at least one excitation light emitted by a light source and to convert at least some of said absorbed excitation light into a light emission having one or more wavelengths different from that of the excitation light. This luminophore, or this plurality of luminophores, may be at least partially embedded in the polymer or indeed placed on the surface of the layer of polymer material.

The invention also relates to a luminous motor-vehicle system, such as a headlamp or a position light or an interior lighting system, including a luminous device such as described above, with a lighting area common to two distinct lighting and/or signalling functions.

The luminous system, in particular a motor-vehicle position light, may comprise the luminous device described above, in particular when the one or more first emission zones emit light beams of white colour, with a lighting area common with a daytime running light.

Furthermore, the light beams of white colour emitted by the luminous motor-vehicle system may each have a distinct white hue. This hue may be adjusted as required.

The invention furthermore relates to a method for driving a luminous device such as described above, wherein a phase of continuous activation of the first emission zones and a phase of intermittent activation of the second emission zones are implemented. Optionally, the first emission zones may remain activated while the second emission zones are turned on, for example when the luminous device is used in a lamp in order to signal the position of the vehicle and whether or not it is braking.

Of course, the features, variants and various embodiments of the invention may be associated with one another, in various combinations, provided that they are not incompatible with one another or mutually exclusive.

BRIEF DESCRIPTION OF THE SEVERAL VIEWS OF THE DRAWINGS

Other features and advantages of the present invention will become more clearly apparent from the description and drawings, in which.

DETAILED DESCRIPTION OF THE INVENTION

Figure 1:
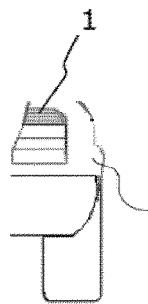
FIG. 1 is a rear view of a motor vehicle comprising a position light including a luminous device according to the invention.

It will be recalled that the invention aims to provide a luminous device for a motor vehicle. As illustrated in FIG. 1, the luminous device may for example be used in a lighting and/or signalling light 1 of a motor vehicle 2.

Figure 2:
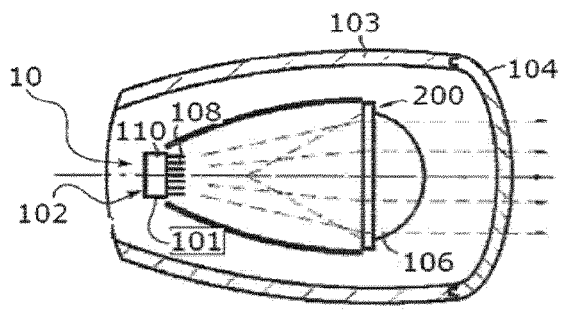
FIG. 2 is a side view of a luminous device according to the invention, in particular allowing a semiconductor light source and a screen arranged to intersect rays emitted by this source to be seen.

More precisely, such as illustrated in FIG. 2, the luminous device 10 is housed in the position light 1, formed from a casing 103 closed by an outer lens 104. In the present example, the luminous device 10 comprises a control module 101, a light source 102 that is driven by the control module and a screen 200 that is illuminated by the light source. If necessary, the luminous device 10 may also comprise an optic 106 for forming at least some of the emitted light rays transmitted by the screen 200.

The light source 102 is a semiconductor source comprising electroluminescent units, here rods, of sub-millimetre dimensions, i.e. three-dimensional semiconductor sources such as will be described below, in contrast to the conventional two-dimensional sources that may be likened to substantially planar sources because of their thickness of about a few nanometres, a source comprising electroluminescent rods rather having a height at least equal to one micron.

Figure 3:
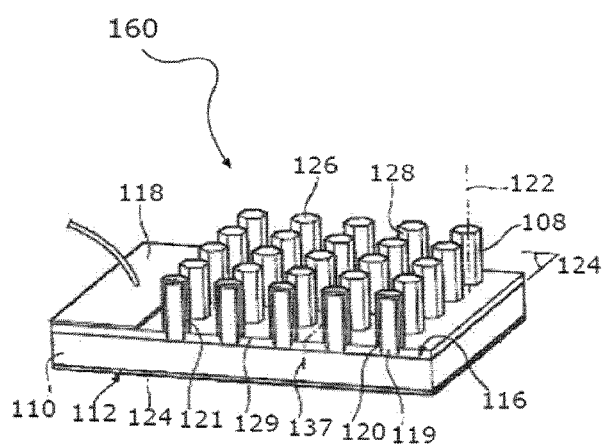
FIG. 3 is a schematic representation, in perspective, of one portion of the semiconductor light source of FIG. 2, in which one row of electroluminescent elements protruding from a substrate has been shown in cross section.

Such as illustrated in FIG. 3, the light source 102 comprises a plurality of emitting elements or electroluminescent rods 108 of sub-millimetre dimensions, which will be called electroluminescent rods below. These electroluminescent rods 108 extend from the same substrate 110. Each electroluminescent rod, here formed using gallium nitride (GaN), extends perpendicularly, or substantially perpendicularly, so as to protrude from the substrate, which is here based on silicon, though other materials such as silicon carbide may be used without departing from the scope of the invention. By way of example, the electroluminescent rods could be made from an alloy of aluminium nitride and gallium nitride (AlGaN), or even from an alloy of aluminium, indium and gallium (AlInGaN).

The substrate 110 has a lower face 112, to which a first electrode has been added, and an upper face 116, from which the electroluminescent rods 108 protrude and to which a second electrode 118 has been added. Various layers of materials are superposed on the upper face 116, in particular after growth of the electroluminescent rods from the substrate, which growth is here obtained via a bottom-up approach. These various layers may include at least one layer of electrically conductive material, in order to allow electrical power to be supplied to the rods. This layer is etched so as to connect such or such rods together, it then being possible for a driver (not shown here) to turn on these rods simultaneously. Provision will then possibly be made for at least two electroluminescent rods or at least two groups of electroluminescent rods of the semiconductor light source to be arranged so as to be able to be turned on separately, by way of the control system 101.

The electroluminescent rods of sub-millimetre dimensions extend from the substrate and include, such as may be seen in FIG. 3, each consisting of a core 119 made of gallium nitride, around which are placed quantum wells 120 formed by a radial superposition of layers of different materials, here gallium nitride and indium-gallium nitride, and a shell 121 surrounding the quantum wells, which is also made of gallium nitride.

Each rod extends along a longitudinal axis 122 defining its height, the base 123 of each rod being located in a plane 124 of the upper face 116 of the substrate 110.

The electroluminescent rods 108 of the semiconductor light source advantageously have the same shape. These rods are each bounded by an end face 126 and by a circumferential wall 128 that extends along the longitudinal axis. When the electroluminescent rods are doped and biased, the resulting light output from the semiconductor source is emitted mainly from the circumferential wall 128, though it will be understood that provision could be made for light rays to also exit, at least in a small amount, from the end face 126. As a result, each rod acts as a single light-emitting diode and the density of the electroluminescent rods 108 improves the radiant emittance of this semiconductor source.

The circumferential wall 128 of a rod 108, corresponding to the gallium-nitride shell, is covered with a transparent conductive oxide (TCO) layer 129 that forms the anode of each rod, this anode being complementary to the cathode formed by the substrate. This circumferential wall 128 extends along the longitudinal axis 122 from the substrate 110 to the end face 126, the distance from the end face 126 to the upper face 116 of the substrate, on which growth of the electroluminescent rods 108 is initiated, defining the height of each rod. By way of example, provision may be made for the height of an electroluminescent rod 108 to be comprised between 1 and 10 microns, whereas provision will be made for the largest transverse dimension of the end face, perpendicularly to the longitudinal axis 122 of the electroluminescent rod in question, to be smaller than 2 microns. Provision will also possibly be made for the area of a rod, in a cross-sectional plane perpendicular to this longitudinal axis 122, to be defined so as to lie within a range of determined values, and in particular between 1.96 and 4 square microns.

It will be understood that, during formation of the rods 108, the height may be modified from one portion to the next of a given light source, so as to increase the luminance of such or such a portion of the semiconductor light source, given that luminance increases when the height of the rods is increased.

The shape of the electroluminescent rods 108 and in particular the cross section of the rods and/or the shape of the end face 126 may also vary from one portion to the next of a given light source. The rods illustrated in FIG. 3 have a cylindrical general shape, and in particular one of polygonal and here more particularly hexagonal cross section.

Figure 5:
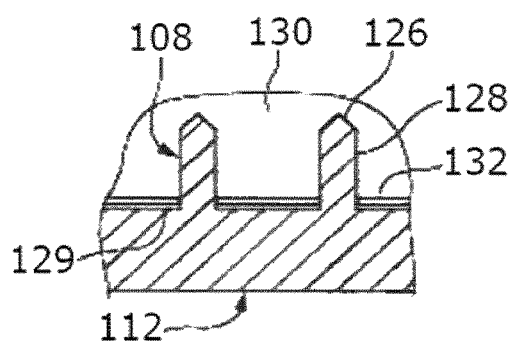
FIG. 5 is a cross-sectional view of a detail of one particular embodiment of a semiconductor light source such as schematically illustrated in FIG. 2, in which embodiment two electroluminescent rods protrude from a substrate, said electroluminescent rods being encapsulated in a protective layer.

Moreover, the end face 126 may be substantially planar and make a right angle to the circumferential wall, and hence lie substantially parallel to the upper face 116 of the substrate 110, such as is illustrated in FIG. 3, or indeed it may be curved or have a tip at its centre, so as to multiply the directions of emission of the light exiting from this end face, such as is illustrated in FIG. 5.

Figure 6:
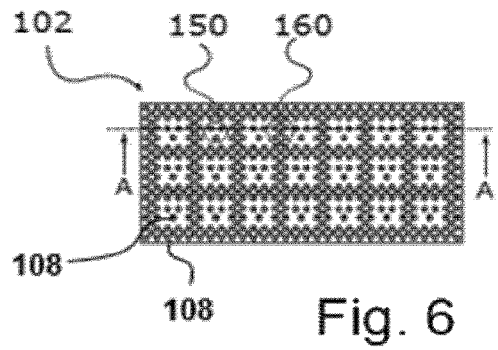
FIG. 6 is a face-on view of a light source that includes a luminous device according to a first embodiment.
Figure 7:
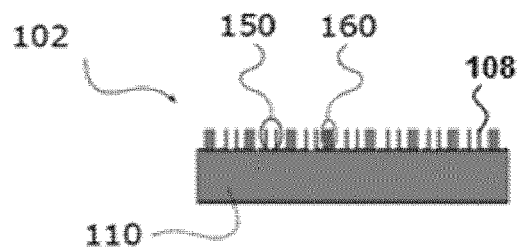
FIG. 7 illustrates the light source of FIG. 6, seen in cross section, along an axis (AA) that is shown in FIG. 6.

Such as may notably be seen in FIGS. 6 and 7 in particular, the electroluminescent rods 108 are arranged on a substrate 110 of rectangular shape, so as to form first emission zones 150 that are encircled by second emission zones 160. More precisely, a first emission zone is bounded by second emission zones. The electroluminescent rods 108 forming the second emission zones 160 are aligned in rows and columns that are perpendicular to one another, so as to form a grid centred on the first emission zones 150. Such as illustrated, the density of rods in each of the second zones is clearly higher than the density of the rods in the first emission zones. This density ratio may be comprised between 5 and 50. More precisely, as illustrated in FIG. 7, the electroluminescent rods 108 forming the second emission zones may define, via the grid that they form, a first emission zone 150 in which the electroluminescent rods are at least three in number and are arranged in a triangle in order to cover, as best as possible, the area of this first emission zone. The density ratio in this example is substantially equal to 9.

Figure 4:
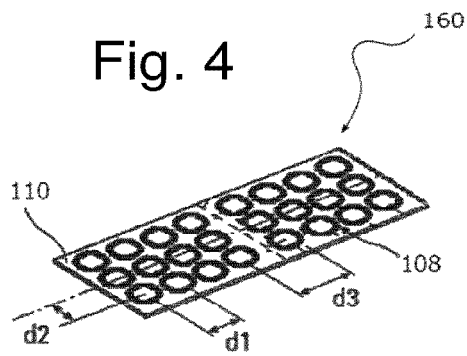
FIG. 4 is a schematic illustration of the arrangement of one portion of the light source of FIG. 3.

The arrangement of the rods forming one portion of a second emission zone 160 has been schematically shown in FIG. 4. FIG. 4 shows the distance d1 separating two electroluminescent rods that are immediately adjacent in a first transverse direction, and the distance d2 separating two electroluminescent rods that are immediately adjacent in a second transverse direction. The separating distances d1 and d2 are measured between two longitudinal axes 122 of adjacent electroluminescent rods. Such as was indicated above, the number of electroluminescent rods 108 protruding from the substrate 110 varies between the first and second emission zones, in order to increase the light density of the second emission zone with respect to the first. It will be noted that one or other of the separating distances d1, d2 must be at least equal to 2 microns, in order for the light emitted by the circumferential wall 128 of each electroluminescent rod 108 to be able to exit from the matrix array of rods. Moreover, provision will be made for these separating distances to not be larger than 100 microns.

The light source may furthermore comprise, such as in particular illustrated in FIG. 5, a layer 130 of a polymer material forming an encapsulation in which the electroluminescent rods 108 are at least partially embedded. The layer 130 may thus extend over the entire extent of the substrate or only about a given group of electroluminescent rods 108. The polymer material, which may in particular be based on silicone, allows the electroluminescent rods 108 to be protected without adversely affecting the scatter of the light rays.

The light source may furthermore comprise a coating 132 of a material that reflects light, which coating is placed between the electroluminescent rods 108 in order to deviate rays that are initially oriented toward the substrate toward the end face 126 of the electroluminescent rods 108. In other words, the upper face 116 of the substrate 110 may comprise a reflecting means that steers light rays that are initially oriented toward the upper face 116 toward the exit face of the light source. Thus, rays that would otherwise be lost are collected. This coating 132 is placed between the electroluminescent rods 108 on the layer 129 of transparent conductive oxide.

As mentioned above, the light source 102 is driven by the control module 101. The control module comprises a computing unit, a memory unit and a power-supply unit (which units are not shown in the figures). The memory unit is configured to store at least one program for driving the light source 102. In the present example, the driving method comprises a phase of continuous activation of the first emission zones 150 and a phase of intermittent activation of the second emission zones 160. It will thus be understood that the first emission zones 150 may remain activated while the second emission zones 160 are activated, for example when the luminous device is used in a light in order to signal, with the same lighting area, the position of the vehicle, via light generated in the first emission zones, and whether or not it is braking, via light generated in the second emission zones. The computing unit is configured to implement this program. The power supply unit allows the preceding units and the light source 102 to operate.

In particular, the control module 101 is configured to selectively activate the first emission zones 150 and/or the second emission zones 160, by way of a single instruction from the control module 101.

Such as was indicated above, the luminous device 10 comprises a control module 101, a light source 102 driven by the control module and a screen illuminated by the light source.

Figure 8:
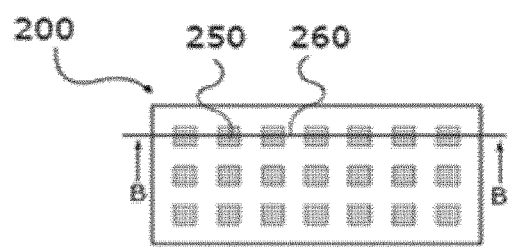
FIG. 8 is a face-on view of a screen that includes the luminous device according to the first embodiment.
Figure 9:
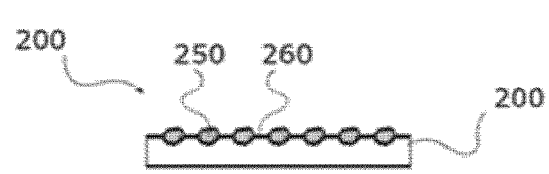
FIG. 9 illustrates the screen of FIG. 8, seen in cross section, along an axis (BB) shown in FIG. 8.

In a first embodiment of a luminous device 10A (shown in FIGS. 10 and 11), the light source 102 emits rays in the direction of a screen 200 of a first type. In the present example, the screen is made from polycarbonate (PC) or polymethyl methacrylate (PMMA), or indeed from optionally rigid silicone, in order to transmit at least some of the light beams emitted by the first and second emission zones. As illustrated in FIGS. 8 and 9, the screen 200 of a first type is a sheet of same shape and same size as the emission area of the light source 102, which is defined by the extent of the electroluminescent rods 108 on the substrate 110.

The screen 200 comprises, on a first 201 of its faces, scattering elements that define first transmission zones 250. More precisely, the dimensions and the arrangement of the first transmission zones 250 form a pattern that is identical to the pattern of the first emission zones 150 on the substrate. The screen also comprises second transmission zones 260. More precisely, a first transmission zone 250 is bounded by the second transmission zones 260. As illustrated in FIG. 8, the second transmission zones may define, via the grid that they form, a first transmission zone 250 comprising scattering elements. In the present example, the pattern formed by the second transmission zones 260 is identical to the grid formed by the second emission zones 160, which grid is shown in FIG. 6. In this pattern formed by the second transmission zones, the scattering elements may in particular be obtained via local modifications to the surface of the screen, and for example via local modifications to its roughness.

Figure 10:
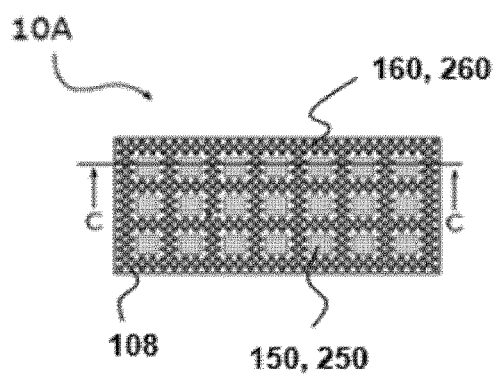
FIG. 10 is a face-on view of the luminous device according to the first embodiment, in which are stacked axially the screen of FIG. 8 and the source of FIG. 6.
Figure 11:
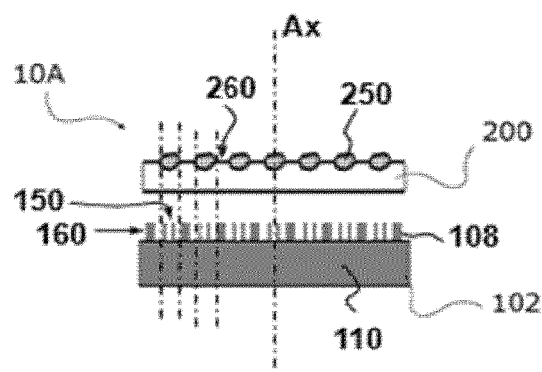
FIG. 11 illustrates the luminous device of FIG. 10, seen in cross section, along an axis (CC) that is shown in FIG. 10.

As illustrated in FIGS. 10 and 11, the screen 200 is positioned in front of the light source 102 so that their facing faces are parallel to each other. More precisely, the first emission zones 150 emit light beams mainly along an axis Ax that is parallel to the axe of elongation of the rods and perpendicular to the substrate 110 and that is illustrated in FIGS. 2 and 11, and the screen 200 is positioned so that the first transmission zones 250 are perpendicular to these axes of elongation.

Moreover, the first transmission and emission zones 250, 150 are aligned when the screen 200 is positioned facing the light source 102, so that, in the direction of the axis Ax and the direction of propagation of the light rays, and such as illustrated in FIG. 11, a first transmission zone 250 is placed downstream of a first emission zone 150 and so that the orthogonal projection of the edges bounding the first transmission zone on the substrate of the light source corresponds to the edges bounding the corresponding first emission zone 150.

Concomitantly and under the same conditions as have just been described, the second transmission and emission zones 260, 160 are aligned when the screen 200 is positioned facing the light source 102.

In the present example, the first transmission zones 250, forming the scattering portion of the screen 200, are formed by giving the surface of the first face 201 of the screen a grain. By way of example, the grain may be obtained using a moulding process or via a mechanical and/or chemical treatment of its surface.

The first face 201 of the screen 200 of the first type is the face placed opposite the light source 102 when the luminous device 10A has been assembled. Thus, the rays emitted by the first emission zones 150 of the light source pass through the thickness of the sheet forming the screen 200 before encountering the scattering elements forming the first transmission zones 250, which are distributed over the first face 201.

Figure 12:
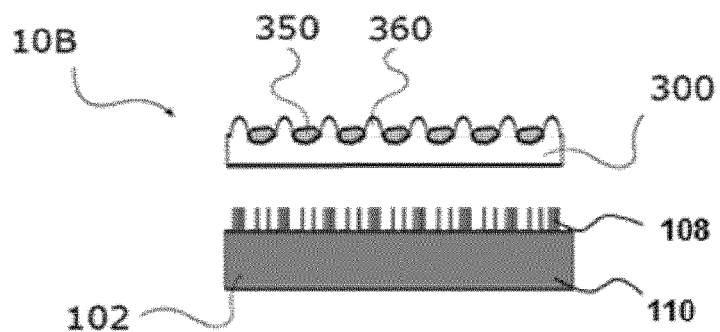
FIG. 12 is a view, similar to that of FIG. 11, illustrating a luminous device according to a second embodiment.

FIG. 12 shows a second embodiment of a luminous device 10B according to the invention, which differs from the preceding one in that the light source 102 is associated with a screen 300 of a second type. The screen 300 of the second type differs from the screen described above in that the second transmission zones 360 comprise micro-lenses so as to make the light beams emitted by the second emission zones 160 converge, in order to increase their light intensity as perceived by an observer in the vicinity of the axis of the vehicle.

In one variant (not shown) of the invention, and which may in particular be implemented in the second embodiment, provision could be made to place the scattering elements on the second face of the screen of a second type, though it will be understood that it remains advantageous to keep the micro-lenses at a distance from the light source, and therefore on the first face of the screen, as they work better there.

The invention claimed is:

1. A luminous device for a motor vehicle, comprising:
a light source including a plurality of emitting elements that are configured to form first emission zones and one second emission zones that are addressable selectively from each other; and
a screen that is at least partially transparent to the light emitted by the light source, the screen comprising first transmission zones and second transmission zones that are respectively arranged facing the first and second emission zones, the first transmission zones being configured to scatter the light beams emitted by the first emission zones,
wherein the first emission zones are encircled by the second emission zones such that each of the first emission zones is bounded by the second emission zones, and
wherein each of the first emission zones and each of the second emission zones comprises a plurality of electroluminescent units of sub-millimeter dimensions in order to emit a light beam.

2. The luminous device according to claim 1, wherein at least one of a of density or a height of the emitting elements of the first emission zones is different than the emitting elements of the second emission zones.

3. The luminous device according to claim 2, wherein the density of the emitting elements is lower in the first emission zones than in the second emission zones.

4. The luminous device according to claim 2, wherein the first transmission zones comprise scattering elements.

5. The luminous device according to claim 2, wherein the second transmission zones of the screen are transparent to the light beams emitted by the second emission zones.

6. The luminous device according to claim 2, wherein the second transmission zones of the screen are configured to decrease the divergence of the light beam emitted by the second emission zones.

7. The luminous device according to claim 1, wherein the first transmission zones comprise scattering elements.

8. The luminous device according to claim 7, wherein the scattering elements are present in the screen and/or on a surface of the screen.

9. The luminous device according to claim 1, wherein the second transmission zones of the screen are transparent to the light beams emitted by the second emission zones.

10. The luminous device according to claim 1, wherein the second transmission zones of the screen are configured to decrease divergence of the light beam emitted by the second emission zones.

11. The luminous device according to claim 1, wherein the first emission zones are activatable independently of the second emission zones.

12. The luminous device according to claim 1, wherein first emission zones emit a light beam of a first color and the second emission zones emit a light beam of a second color.

13. The luminous device according to claim 12, wherein the first color is identical to the second color.

14. A luminous motor-vehicle system including a luminous device according to claim 1, with a lighting area common to two distinct lighting and/or signalling functions.

15. The luminous system according to claim 14, wherein it forms a position light and a daytime running light.

16. The luminous system according to claim 14, wherein the two distinct lighting and/or signalling functions each have a distinct white hue.

17. A method for driving a luminous device according to claim 1, comprising implementing a phase of continuous activation of the first emission zones and a phase of intermittent activation of the second emission zones.

18. The method according to claim 17, wherein the first emission zones remain activated while the second emission zones are turned on.

19. The luminous device according to claim 1, wherein the plurality of emitting elements forming the second emission zones are aligned in rows and columns that are perpendicular to one another so as to form a grid centered on the first emission zones.

* * * * *